(12) United States Patent
Kishimoto (10) Patent No.: US 8,194,311 B2
(45) Date of Patent: Jun. 5, 2012

(54) SCANNING LASER MICROSCOPE (75) Inventor: Hiroshi Kishimoto, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/814,166

(22) Filed: Jun. 11, 2010

(65) Prior Publication Data

US 2010/0245994 A1   Sep. 30, 2010

Related U.S. Application Data (63) Continuation of application No. PCT/JP2008/072611, filed on Dec. 12, 2008.

(30) Foreign Application Priority Data

Dec. 13, 2007 (JP) ................................. 2007-322064

(51) Int. Cl.
*G02B 21/00* (2006.01)
*H04N 1/053* (2006.01)
(52) U.S. Cl. ..................... 359/368; 348/206; 700/306
(58) Field of Classification Search .................. 359/368, 359/385; 700/306; 348/195, 203, 205
See application file for complete search history.

(56) References Cited

U.S. PATENT DOCUMENTS

| 2006/0086887 A1* | 4/2006 | Nakata et al. .............. 250/201.3 |
| 2006/0129353 A1* | 6/2006 | Hattori et al. ................ 702/183 |
| 2006/0157638 A1 | 7/2006 | Takamizawa |

FOREIGN PATENT DOCUMENTS

| JP | 2003-098468 A | 4/2003 |
| JP | 2003-177323 A | 6/2003 |
| JP | 2005-352030 A | 12/2005 |
| JP | 2006-145857 A | 6/2006 |

OTHER PUBLICATIONS

International Search Report for International Application No. PCT/JP2008/072611 mailed on Mar. 17, 2009, 4 pages.

* cited by examiner

*Primary Examiner* — Mark Consilvio
(74) *Attorney, Agent, or Firm* — Osha • Liang LLP (57) ABSTRACT

A scanning laser microscope obtains images by performing scanning with laser light. The scanning laser microscope includes scanner and controller. The scanner is applied for performing scanning with the laser light line by line. The controller is applied for calculating a required line scanning time that is required as time used for scanning one line, based on the time required for scanning one frame that is determined from a frame rate being set. The controller is also applied for adjusting at least one of a number of data in one line of drive waveform data for driving the scanner and a read cycle of the drive waveform data, so as to substantially match the time for the scanner to scan one line with the required line scanning time calculated by the controller.

5 Claims, 6 Drawing Sheets

SCANNING LASER MICROSCOPE

CROSS-REFERENCE TO RELATED APPLICATION

The present application is a Continuation and claims benefit, pursuant to 35 U.S.C. §120, of International Application No. PCT/JP2008/072611 filed on Dec. 12, 2008 and incorporated by reference in its entirety herein. This application is based upon and claims the benefit of priority from prior Japanese Patent Application No. 2007-322064, filed Dec. 13, 2007, the entire contents of which are incorporated herein by reference.

TECHNICAL FIELD

The present invention relates to a scanning laser microscope, and more particularly to a scanning laser microscope that can obtain images at an arbitrary frame rate.

BACKGROUND ART

A conventional scanning laser microscope drives a mirror to reflect the laser light using a scanner, and obtains an image by performing raster-scanning with the laser light that irradiates on a sample.

For example, a scanning laser microscope has a memory for storing a table in which drive waveform data, to indicate each position on which the laser light is irradiated, is registered, and performs scanning with the laser light at the speed according to the read cycle to sequentially read the drive waveform data from the memory (e.g. see Patent Document 1).

In such a scanning laser microscope, the line scanning time for the laser light to scan one line is determined according to a product of a number of data in one line of the drive waveform data that is registered in a table of a memory and a read cycle of the drive waveform data. The frame rate of images obtained by the scanning laser microscope is determined according to a product of the line scanning time and a number of raster-scanned lines.

Also in the scanning laser microscope, the read cycle of the drive waveform data is set by the user selecting a dividing ratio of a divider which converts the reference frequency of clock signals to be a reference of the general operation of the scanning laser microscope. As mentioned above, the line scanning time is determined according to a product of the read cycle of the drive waveform data and the number of data in the drive waveform data, and the frame rate is determined according to a product of the line scanning time and the number of lines. Therefore the frame rate changes discontinuously according to a value multiplied by the number of data in the drive waveform data, or a value multiplied by the number of lines when the dividing ratio changes, and resolution to change the frame rate is determined by the resolution of changing the dividing ratio.

[Patent Document 1] Japanese Patent application Laid-Open No. 2003-98468

However, when the user attempts to slightly change the read cycle by changing only one step of the dividing ratio that can be changed, the desired frame rate may not be able to be selected since the frame rate is changed discontinuously. In other words, images cannot be obtained at an arbitrary frame rate.

DISCLOSURE OF THE INVENTION

With the foregoing in view, it is an object of the present invention to obtain images at an arbitrary frame rate.

A first scanning laser microscope of the present invention is a scanning laser microscope that performs scanning on a sample with laser light, and obtains images of the sample using the light from the sample, comprising: scanning means for performing scanning with the laser light line by line; calculation means for calculating a required line scanning time that is required as time used for scanning one line, based on the time required for scanning one frame that is determined from a frame rate being set; and adjustment means for adjusting at least one of a number of data in one line of drive waveform data for driving the scanning means and a read cycle of the drive waveform data, so as to substantially match the time for the scanning means to scan one line with the required line scanning time calculated by the calculation means.

According to the first scanning laser microscope of the present invention, the scanning means performs scanning with the laser light line by line, and the calculation means calculates the required line scanning time that is required as the time used for scanning one line, based on the time required for scanning one frame that is determined from a frame rate being set. Then the adjustment means adjusts at least one of a number of data in one line of drive waveform data for driving the scanning means and a read cycle of the drive waveform data, so as to substantially match the time for scanning means to scan one line with the required line scanning time calculated by the calculation means.

A second scanning laser microscope of the present invention is a scanning laser microscope that performs scanning on a sample with laser light, and obtains images of the sample using the light from the sample, comprising input means for inputting a frame rate to indicate a speed of obtaining images of the sample.

According to the second scanning laser microscope of the present invention, the frame rate to indicate a speed of obtaining images of the sample is input.

According to the scanning laser microscope of the present invention, the time for scanning one line is substantially matched with the required line scanning time, so images can be obtained at an arbitrary frame rate.

EXPLANATION OF REFERENCE SYMBOLS 1 confocal laser scanning microscope
2 sample
11 laser light source
12 dichroic mirror
13X and 13Y mirror
14X and 14Y scanner
15 scanning lens system
16 objective lens 17 pin hole
18 fluorescent filter
19 detector
20 control device
21 display device
51 scanner drive system
61 controller
62 reference clock generator
63 divider
64X and 64Y divider
65X and 65Y address generator
66X and 66Y memory
67X and 67Y D/A converter
68X and 68Y drive circuit

BEST MODE FOR CARRYING OUT THE INVENTION

Embodiments of the present invention will now be described with reference to the drawings.

Figure 1:
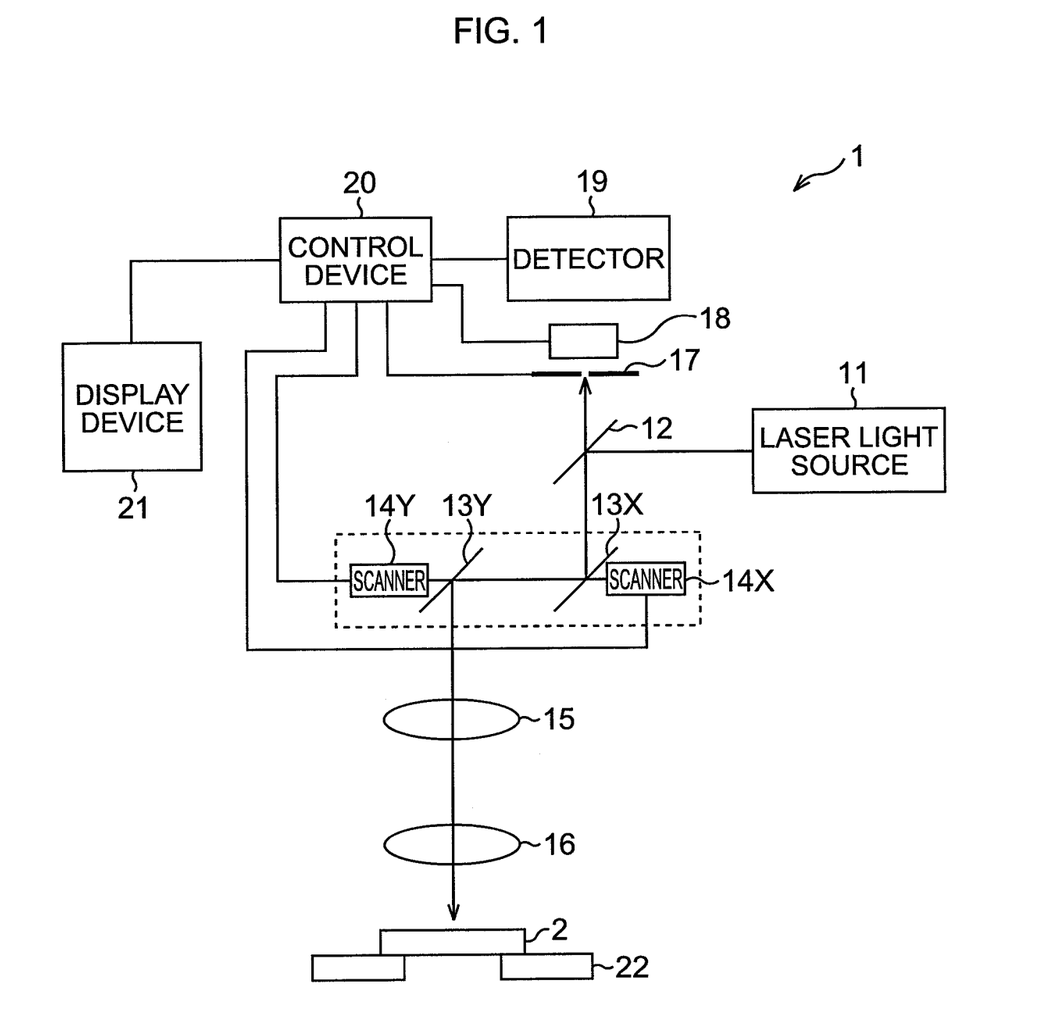
FIG. 1 is a diagram depicting an embodiment of an optical system of a confocal laser scanning microscope to which the present invention is applied.

FIG. 1 is a diagram depicting an embodiment of an optical system of a confocal laser scanning microscope 1 to which the present invention is applied. The operation of the optical system of the confocal laser scanning microscope 1 will now be described.

Laser light (excitation light) emitted from a laser light source 11 is guided to a scanner optical system via an optical fiber (not illustrated) of which output end is connected to a fiber connector (not illustrated). The laser light guided into the scanner optical system is reflected by a dichroic mirror 12 in a direction to a mirror 13X. The two mirrors 13X and 13Y are constituted by total reflection mirrors, and the laser light reflected in the direction to the mirror 13X is reflected by the mirror 13X and mirror 13Y in a direction to a scanning lens system 15. The laser light is condensed by transmitting through the scanning lens system 15 and an objective lens 16, and is irradiated onto a sample 2 on a stage 22.

A control device 20 drives a scanner 14X and controls the angle of the mirror 13X in order to scan the laser light irradiated onto the sample 2 in a left and right directions (x axis direction) of the confocal laser scanning microscope 1, and drives a scanner 14Y and controls the angle of the mirror 13Y in order to scan the laser light irradiated onto the sample 2 in the depth direction (y axis direction) of the confocal laser scanning microscope 1.

The fluorescence, which is excited by irradiation of the laser light and emitted from the sample 2, transmits through the objective lens 16 and the scanning lens system 15, descanned by the mirror 13Y and mirror 13X, and transmits through the dichroic mirror 12. Then only the fluorescent light emitted from the focal plane on the objective lens 16, out of the descanned fluorescent light, passes through a pin hole 17, predetermined wavelength components are filtered through a fluorescent filter 18, and are converted into electric signals by a detector constituted by PMT (PhotoMulTiplier), for example. The electric signals are supplied to the control device 20, converted into image data by the control device 20, and are supplied to a display device 21. The display device 21 displays the image based on the image data, that is, the image of the sample 2.

The confocal laser scanning microscope 1 performs rasterscanning with the laser light irradiated onto the sample 2, that is, moves the laser light one step in the y axis direction every time one line is scanned in the x axis direction, and obtains one frame of an image by repeating the scanning with the laser light in the x axis direction for a predetermined number of lines.

One frame time, which is the time required for obtaining one frame of images, is determined based on the line scanning time required for scanning one line in the x axis direction, number of lines in the x axis direction, and frame return time which is the time required for moving from a position where driving of the last line of one frame ends to a position where driving of the first line starts. In other words, one frame time has a relationship of one frame time=line scanning time× number of lines+frame return time.

In the case of the confocal laser scanning microscope 1, if the user inputs (sets) a desired frame rate (speed of obtaining images of the sample) by operating an input unit, which is not illustrated, the control device 20 determines one frame time and the line scanning time so that images are obtained at the frame rate requested by the user.

In addition to the above mentioned operation, the control device 20 also controls the pin hole diameter of the pin hole 17, and controls the switching of the fluorescent filter 18.

Figure 2:
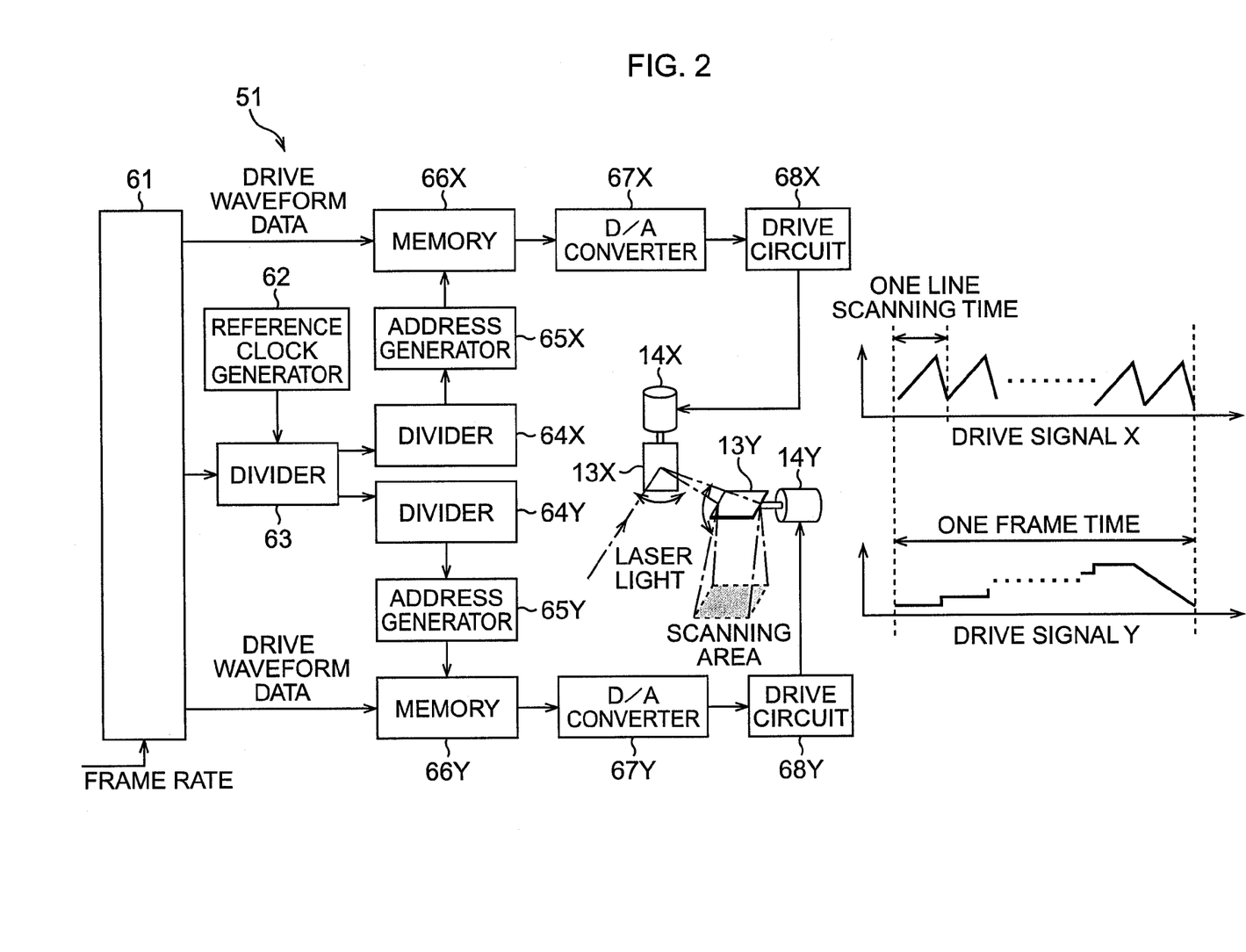
FIG. 2 is a block diagram depicting an example of a configuration of a scanner drive system 51.

FIG. 2 is a block diagram depicting an example of the configuration of a scanner drive system 51 for driving the mirror 13X and the mirror 13Y via the scanner 14X and the scanner 14Y to control scanning with the laser light, out of the elements constituting the control device 20 of the confocal laser scanning microscope 1.

A controller 61 is constituted by a processor, such as a CPU (Central Processing Unit), for example, and controls the operation of the entire scanner drive system 51 by executing predetermined control programs.

For example, a frame rate, which is input by the user, is supplied to the controller 61, and the controller 61 calculates a frame time based on the frame rate requested by the user (hereafter called "required frame time"), and determines a line scanning time that is required for scanning the scanning area, which is an area to be scanned by the laser light, in the required frame time (hereafter called "required line scanning time").

The controller 61 generates drive waveform data for generating a drive signal X for controlling the driving of the scanner 14X, based on the required frame time and required line scanning time, and stores the drive waveform data in the memory 66X, and also generates drive waveform data for generating a drive signal Y for controlling the driving of the scanner 14Y and stores the drive waveform data in the memory 66Y. Further the controller 61 sets the dividing ratios of the divider 63, divider 64X and divider 64Y respectively based on the required frame time and required line scanning time.

A reference clock generator 62 generates reference frequency clock signals to be a reference of the operation of the entire scanner drive system 51, and supplies the reference frequency clock signals to the divider 63.

The divider 63 converts the reference frequency clock signal supplied from the reference clock generator 62 using the dividing ratio that is set by the controller 61, and supplies the converted frequency clock signal to the divider 64X and the divider 64Y respectively. For example, if the reference frequency of the clock signal generated by the reference clock generator 62 is 10 MHz, then the reference clock cycle is 0.1 μs, and the divider 63 outputs clock signals having a cycle that is a multiple of 0.1 μs.

The divider 64X converts the clock signal supplied from the divider 63 using the dividing ratio that is set by the controller 61 via the divider 63, and supplies the converted frequency clock signal to an address generator 65X. In the same manner, the divider 64Y converts the clock signal supplied from the divider 63 using the dividing ratio that is set by the controller 61 via the divider 63, and supplies the converted frequency clock signal to an address generator 65Y.

The address generator 65X generates an address signal to instruct an address from which data is read, synchronizing with the clock signal from the divider 64X, and supplies this address signal to the memory 66X. In the same manner, the address generator 65Y generates an address signal to instruct an address from which data is read, synchronizing with the clock signal from the divider 64Y, and supplies this address signal to the memory 66Y.

In a memory 66X, drive waveform data to generate the drive signal X, generated by the controller 61, is stored, and the memory 66X sequentially outputs the drive waveform data in an address specified by the address signal supplied from the address generator 65X, to a D/A converter 67X according to the timing of supplying the address signal.

The read cycle, which is a cycle of reading the drive waveform data from a drive table stored in the memory 66X to the D/A converter 67X, is an inverse number of the frequency of the clock signal which is supplied from the divider 64X to the address generator 65X, and is the product of the cycle of clock signal generated by the reference clock generator 62, dividing ratio which is set in the divider 63, and dividing ratio which is set in the divider 64X.

In the memory 66Y, drive waveform data to generate the drive signal Y generated by the controller 61 is stored, and the memory 66Y sequentially outputs the data in an address specified by the address signal supplied from the address generator 65Y, to a D/A converter 67Y according to the timing of supplying the address signal.

The D/A converter 67X converts the drive waveform data which was read from the memory 66X into analog signals, and supplies these signals to the drive circuit 68X. In the same manner, the D/A converter 67Y converts the drive waveform data which was read from the memory 66Y into analog signals, and supplies these signals to the drive circuit 68Y.

The drive circuit 68X supplies a voltage drive signal X, corresponding to the drive waveform data read from the drive table, to the scanner 14X based on the analog signals from the D/A converter 67X, so as to control the angle of the mirror 13X.

When a number of data in the drive waveform data of the drive table stored in the memory 66X is 1000, for example, it takes 1 ms to read one line if each data is read at 1 μs. Therefore if the dividing ratio of the divider 63 is set to "1" and the dividing ratio of the divider 64X is set to "10" when the clock signal reference frequency is 10 MHz, then the cycle of the clock signal to be input to the address generator 65X becomes 1 μs, and the drive circuit 68X drives the scanner 14X such that the laser light scans at 1000 lines/s. When all the valid data in the drive table of the memory 66X is read, the address generator 65X is reset to "0", and the cycle count is set so that the same waveform is repeatedly generated.

Just like the drive circuit 68X, the drive circuit 68Y supplies a voltage drive signal Y corresponding to the drive waveform data read from the drive table, to the scanner 14Y, based on the analog signal from the D/A converter 67Y, so as to control the angle of the mirror 13Y.

If the controller 61 sets the dividing ratio of the divider 64Y so as to match with the cycle count of the address generator 65X, for example, the laser scanning microscope can be operated such that the input to the address generator 65Y is updated every cycle in the x axis direction. In other words, every time scanning one line in the x direction completes, the drive position in the y axis can be updated. If the address generation 65Y is set to circulate output based on a number of lines in the y axis direction and a number of return lines, one frame of the drive cycle is set.

In the drive signal X which the drive circuit 68X supplies to the scanner 14X, a sawtooth voltage is repeated in every one line of scanning time, as shown in FIG. 2, that is, the voltage is increased from the voltage to indicate the beginning of the line to the voltage to indicate the end of the line at a predetermined scanning speed to perform scanning with the laser light in the x axis direction to obtain the image, then the voltage is dropped to the voltage to indicate the beginning of the line at a speed the same as or faster than the scanning speed.

In the drive signal Y which the drive circuit 68Y supplies to the scanner 14Y, stepwise voltage is repeated in every one frame time, as shown in FIG. 2, that is, the voltage is increased one step to the voltage to indicate the next line every time the scanning of one line in the x direction ends, and when the voltage rises from the first line to the last line, the voltage drops to the voltage to indicate the first line during a predetermined line return time.

The line scanning time for the scanner 14X to perform scanning with the laser light for one line is set to match with the required line scanning time is determined based on the frame rate which is input by the user.

For example, the controller 61 determines one frame time by computing the inverse number of the frame rate that is input by the user, and calculates the required line scanning time based on the above mentioned relationship of one frame time=line scanning time×number of lines+frame return time. The number of lines is set based on the resolution in the y axis direction, for example. The frame return time is set based on the characteristics of the scanner 14Y and other drive mechanisms, for example.

The line scanning time, on the other hand, is a product of the number of data in one line registered in the drive table of the memory 66X and by the read cycle when one data is read from the memory 66X to the D/A converter 67X. Therefore the controller 61 determines the line scanning time to be a desired line scanning time by adjusting a number of data in one line or read cycle (that is, the dividing ratios of the divider 63 and the divider 64X).

For example, the drive waveform data for generating the drive signal X has a shape that is roughly predetermined, as shown in FIG. 2, and the controller 61 temporarily sets the line scanning time using the predetermined drive waveform data and the predetermined read cycle, and reduces the read cycle in steps. When the temporary set line scanning time becomes the required line scanning time or less, the controller 61 increases the number of data in the drive waveform data until the line scanning time matches the required line scanning time (or time within a prescribed range from the required line scanning time), so as to adjust (set again) the line scanning time. At this time, the line scanning time is adjusted so that the scanning speed in the capture area, that is, an area in which images are obtained, becomes constant, in other words, so that the images to be obtained are not affected.

Now the line scanning time that is adjusted by increasing the number of data in the drive waveform data will be described with reference to FIG. 3.

Figure 3:
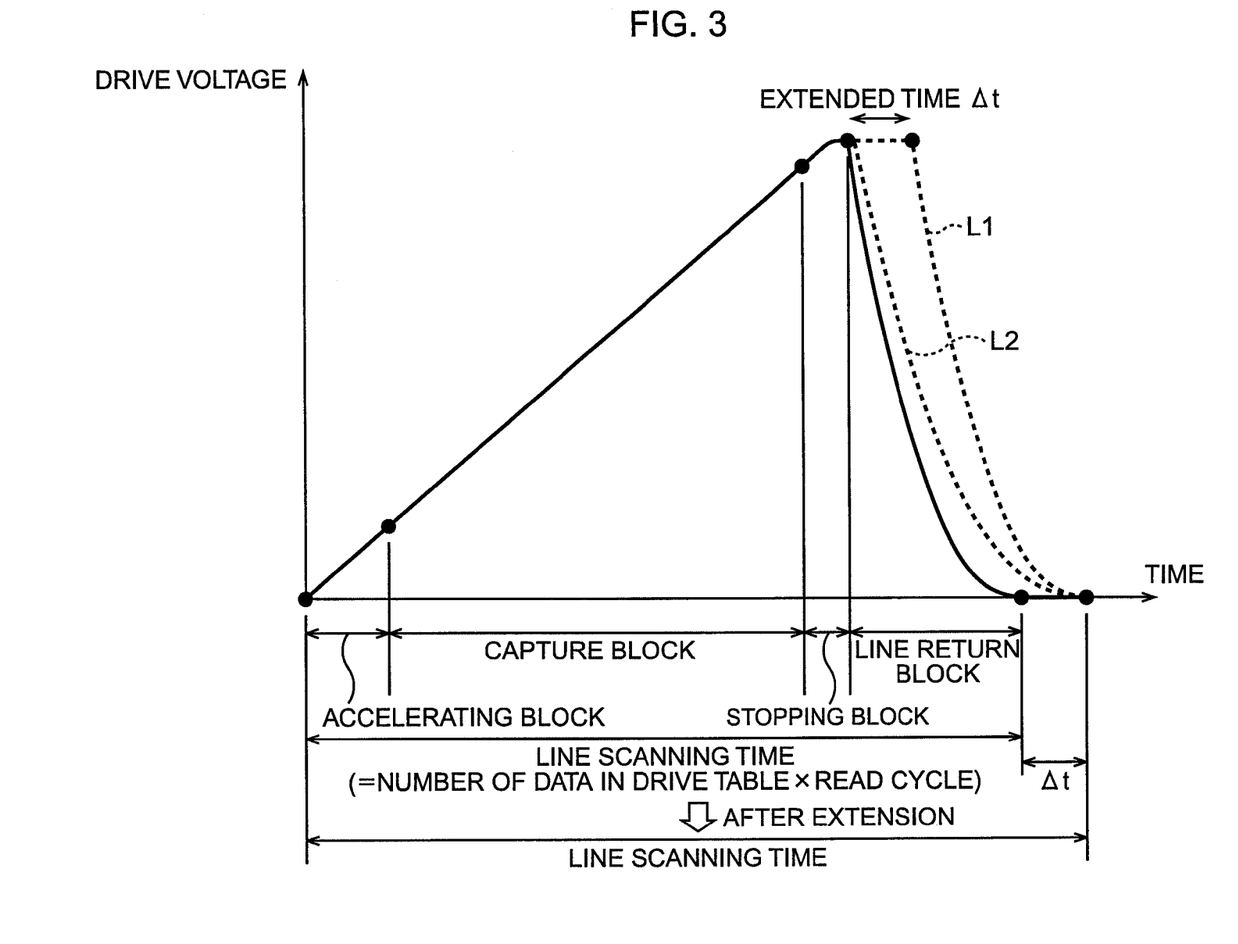
FIG. 3 is a diagram depicting the line scanning time.

FIG. 3 shows a drive signal X during one line scanning time, where the abscissa indicates the time and the ordinate indicates the drive voltage (voltage value of the drive signal X).

The line scanning time is divided into an accelerating block, capture block, stopping block and line return block.

The accelerating block is the time required from the start of scanning with laser light at the start point of the line to stabilizing at a predetermined scanning speed. The capture block is the time for the laser light to scan the capture area at a predetermined scanning speed. The stopping block is the time when the scanning speed of the laser light decelerates gradually, and stops at the end point of the line. The line return block is the time required for driving from the end point of the line to the next start point.

For example, to adjust the line scanning time, the controller 61 generates the drive waveform data in which the stopping block is extended, as shown in the broken line L1 in FIG. 3, so that the voltage to indicate the end of the line is extended from the end of the stopping block by the extended time Δt. In other words, the required number of data of the drive waveform data for generating the voltage to indicate the end of the line are inserted between the stopping block and the line return block, so that the line scanning time matches with the required line scanning time.

Since the laser light is stopped at the end of the stopping block, even if the drive waveform data for generating voltage to indicate the end of the line is inserted at the end of the stopping block, this does not affect the scanning speed in the capture block.

In this way, data corresponding to the extended time Δt is inserted, and after the stopping block is extended to extend the line scanning time, the line return block shifts backward by the extended time Δt, and the line scanning time is extended by the extended time Δt.

Instead of extending the stopping block, the controller 61 may generate a drive waveform data, in which a number of data in the line return block is increased by the extended time Δt, to extend the line return block so that the inclination of the curve, when the drive voltage drops in the line return block, is changed, as shown in the broken line L2 in FIG. 3, whereby the line scanning time is extended by the extended time Δt.

The controller 61 may adjust the line scanning time by increasing/decreasing the number of data in the acceleration block within a range where the scanning speed of the laser light in the capture block is not affected. In other words, if the number of data in the capture block is changed, the scanning result, that is the image to be obtained, is affected, so the controller 61 adjusts the line scanning time by changing the number of data in the stopping block, line return block and accelerating block, in which the image is not affected. The controller 61 can select an optimum block in which the number of data of the drive waveform data is changed based on the configuration of the drive mechanism and drive speed, for example, so that the image is not affected.

When a number of data in the stopping block, line return block and accelerating block are determined, the controller 61 first determines the time required for scanning in the capture block based on the required line scanning time and the size of the capture area. Then the scanning time per pixel (dual pixels) is calculated based on the scanning time in the capture block and the resolution in the x axis direction, and the number of data in the stopping block, line return block and accelerating block (that is, the time for a respective block) are temporarily set based on the function of the scanning time per pixel. Then until the line scanning time, which is determined based on the temporarily set number of data in the stopping block, line return block and accelerating block matches the required line scanning time, (or becomes within a predetermined range from the required scanning time), the processing to change the number of data and read cycle in these blocks is repeated.

The algebra to determine the drive waveform data and read cycle may be determined in advance by experiment or simulation when the required line scanning time is input, for example, so that the drive waveform data and read cycle are determined according to the algebra.

Figure 4:
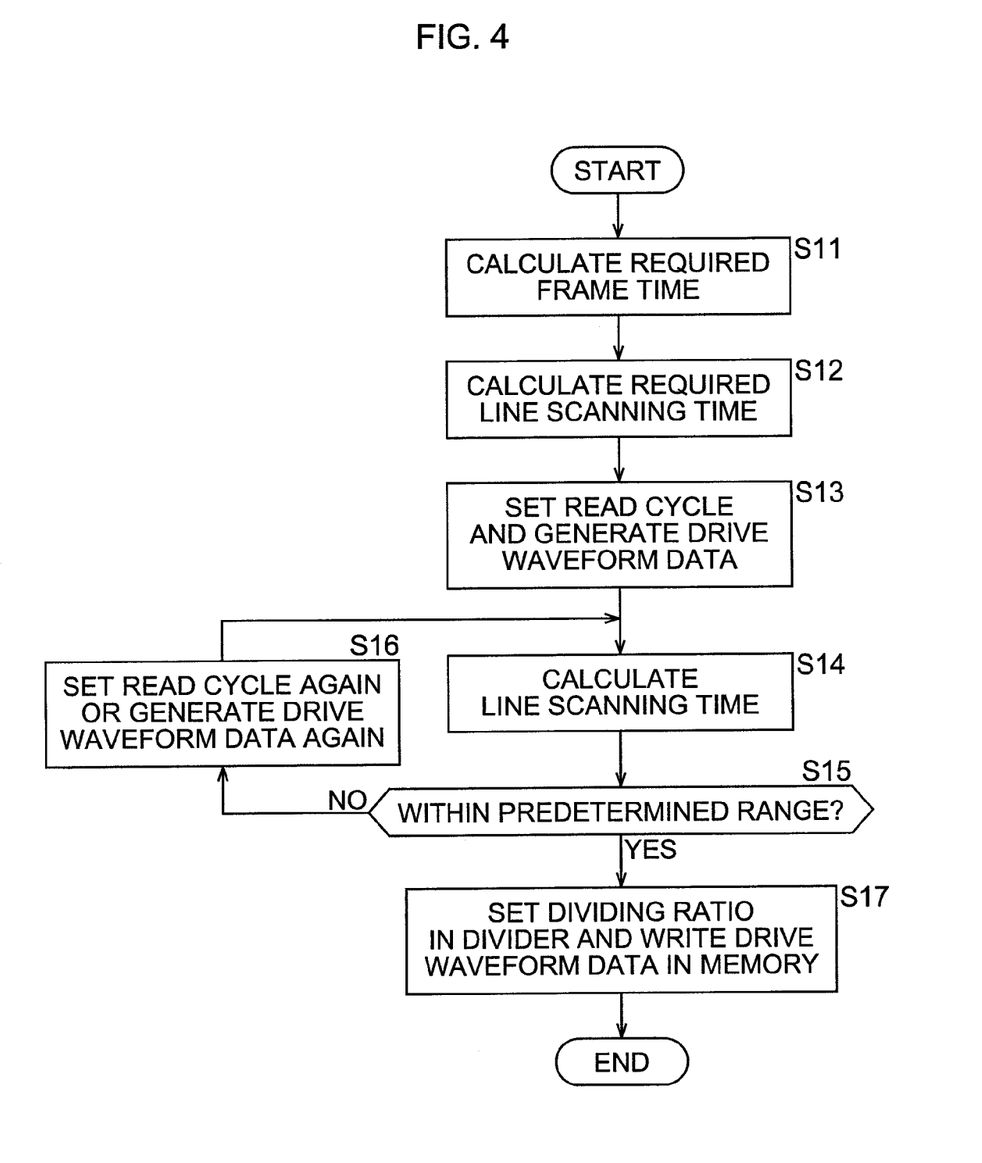
FIG. 4 is a flow chart depicting a processing for the controller 61 to adjust the line scanning time.

FIG. 4 is a flow chart depicting a processing for the controller 61 in FIG. 2 to adjust the line scanning time.

For example, the processing starts when the user inputs a frame rate and the frame rate is supplied to the controller 61, and in step S11, the controller 61 determines the required frame time by computing the inverse number of the frame rate which the user input, and the processing advances to step S12.

In step S12, the controller 61 calculates the required line scanning time based on the required frame time determined in step S11, a number of lines in the scanning area, and the frame return time.

After the processing in step S12, the processing advances to step S13, where the controller 61 sets the read cycle and generates the drive waveform data, based on the required line scanning time calculated in step S12, and processing advances to step S14.

In step S14, the controller 61 calculates the line scanning time for the scanner 14X to perform scanning with the laser light on an actual one line based on the read cycle, which was set in step S13, and the drive waveform data generated in step S13.

After the processing in step S14, processing advances to step S15, and the controller 61 judges whether the line scanning time calculated in step S14 is within a prescribed range, which is specified in advance according to a predetermined accuracy, from the required line scanning time calculated in step S12.

If the controller 61 judges in step S15 that the line scanning time, calculated in step S14, is not within a prescribed range from the required line scanning time calculated in step S12, processing advances to step S16, where the controller 61 sets the read cycle again, or generates the drive waveform data again, as mentioned above, then processing returns to step S14, and the same processing is performed hereafter.

If the controller 61 judges in step S15 that the line scanning time calculated in step S14 is within a prescribed range from the required line scanning time calculated in step S12, processing advances to step S17.

In step S17, the controller 61 determines the dividing ratios of the divider 63 and the divider 64X respectively, so that the drive waveform data stored in the memory 66X is read at the read cycle used for calculating the line scanning time, which was judged as within a prescribed range from the required line scanning time calculated in step S12, and sets these dividing ratios in the divider 63 and the divider 64X. The controller 61 stores the drive waveform data, used for calculating the line scanning time, which was judged as within a prescribed range from the required line scanning time calculated in step S12, in the memory 66X, and processing ends.

As described above, the controller 61 determines the read cycle and generates the drive waveform data so that the line scanning time is within a prescribed range from the required line scanning time, so the confocal laser scanning microscope 1 can accurately implement the frame rate which the user input, and obtain images at this frame rate.

In the case of the conventional scanning laser microscope, an arbitrary frame rate cannot be set unless the resolution of the dividing ratio is sufficiently small, but according to the confocal laser scanning microscope 1, an arbitrary frame rate can be set by adjusting the number of data of the drive waveform data, even if the resolution of the dividing ratio is not sufficiently small.

As a method for changing the read cycle to read the drive waveform data from the memory 66X in order to adjust the line scanning time, a method other than a method of using the divider 63 and divider 64X, shown in FIG. 2, can be used.

Figure 5:
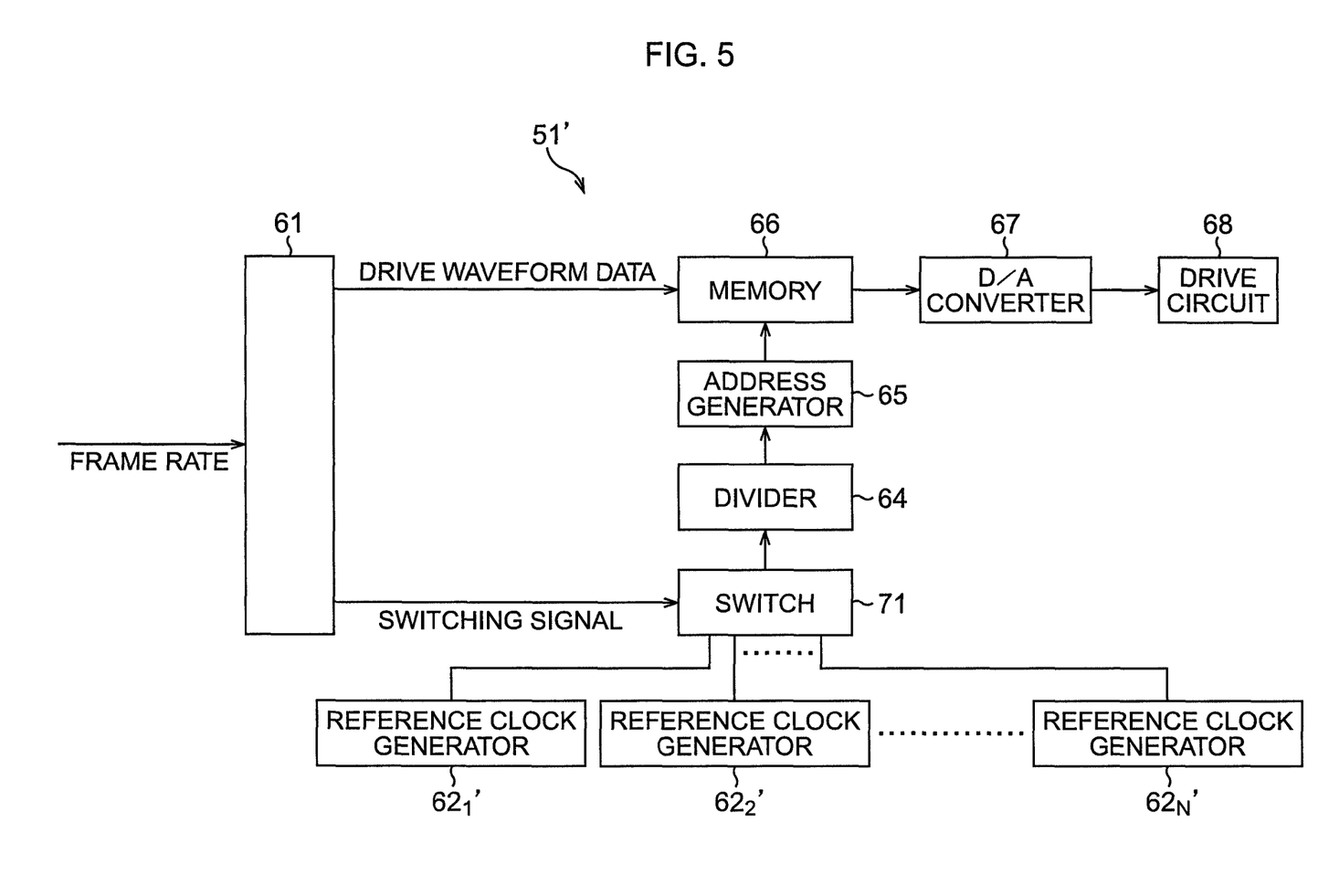
FIG. 5 is a diagram depicting a method for adjusting the line scanning time using a plurality of reference clock generators.
Figure 6:
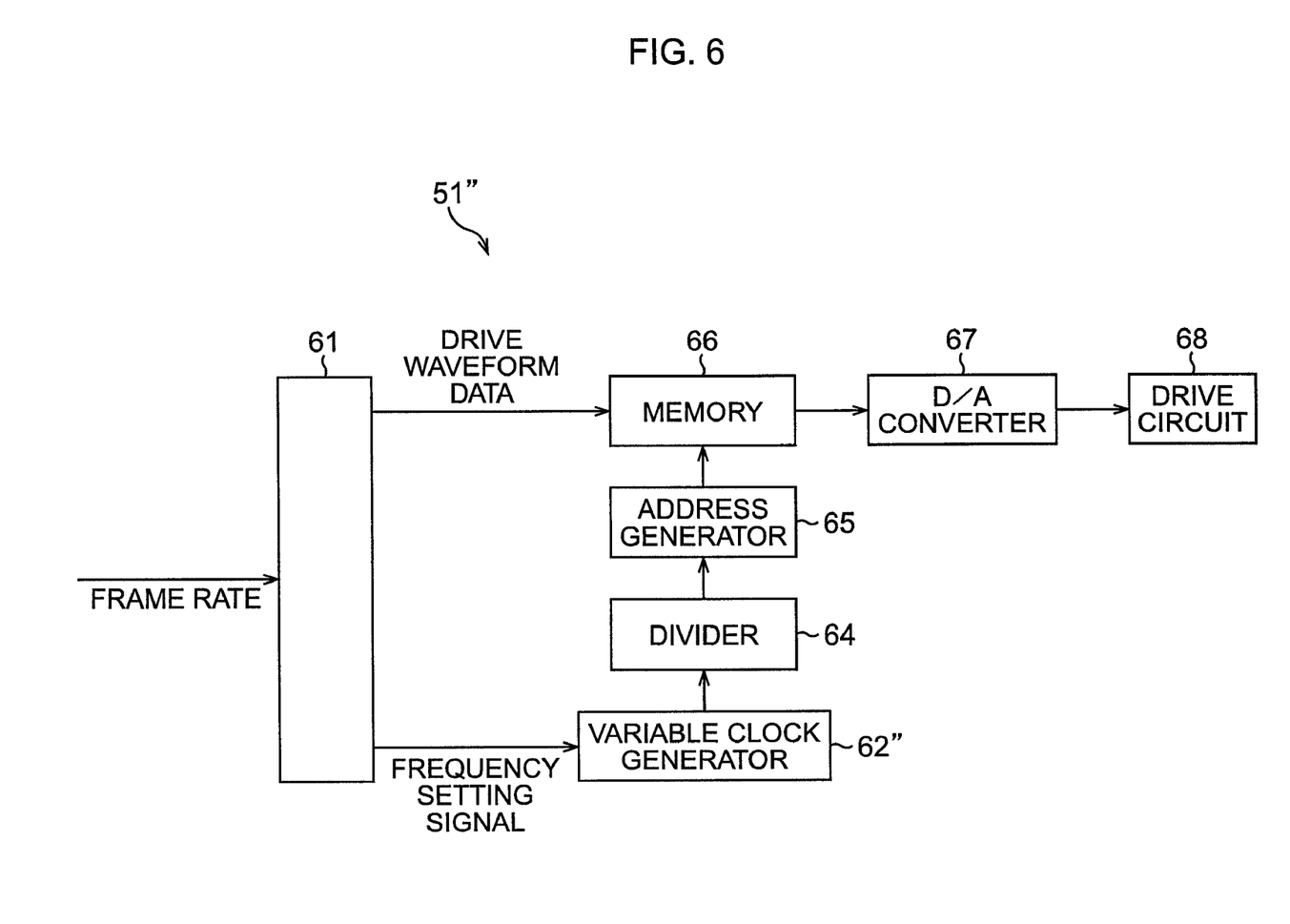
FIG. 6 is a diagram depicting a method for adjusting the line scanning time using a variable clock generator.

For example, FIG. 5 shows a scanner drive system 51' which adjusts the line scanning time using a plurality of reference block generators, and FIG. 6 shows a scanner drive system 51'' which adjusts the line scanning time using a variable clock generator. In FIG. 5 and FIG. 6, the controller 61, divider 64, address generator 65, memory 66, D/A converter 67 and drive circuit 68 are constructed in the same manner as FIG. 2, therefore description thereof is omitted.

According to the scanner drive system 51' in FIG. 5, the N number of reference clock generators $62_1'$ to $62_N'$ generate clock signals having different frequencies from one another. The switch 71 switches outputs from N number of reference clock generators $62_1'$ to $62_N'$ according to the switch signal that is supplied from the controller 61, and supplies a clock signal generates one of these reference clock generators to the divider 64.

According to the scanner drive system 51'' in FIG. 6, the variable clocking generator 62'' can generate clock signals having a plurality of different frequencies, and supplies the clock signals to the divider 64 with changing the frequency thereof according to the frequency setting signal supplied from the controller 61.

In the scanner drive system 51' or 51'' constructed like this, if the controller 61 generates the drive waveform data based on the frame rate which the user input, and sets the read cycle as described with reference to FIG. 2, and supplies the switch signal to the switch 71 or the frequency set value to the variable clock generator 62'', then images at the frame rate matching with the required frame rate can be obtained.

The time for the drive signal Y to increase one step is based on the line scanning time of the drive signal X, and the frame time is adjusted by changing the drive signal Y synchronizing with the change of the drive signal X.

Each processing described with reference to the above flow chart need not be processed in the time series according to the sequence of the flow chart, but includes processings which are executed in parallel or independently (e.g. parallel processing or processing by object).

The embodiments of the present invention are not limited to the above mentioned embodiments, but numerous modifications can be made without departing from the spirit and scope of the invention.

The invention claimed is:

1. A scanning laser microscope that obtains images by performing scanning with laser light, comprising:
    a scanner that performs scanning with the laser light line by line; and
    a controller that calculates a required line scanning time that is required as time used for scanning one line by the scanner, based on the time required for scanning one frame that is determined from a frame rate being inputted,
    wherein the controller selects at least one of the number of data in one line of driving waveform data for driving the scanner and the read cycle of the driving waveform data, as a factor to be adjusted, such that a line scanning time of the scanner to scan one line is made to be substantially equal to the calculated required line scanning time, and
    wherein the controller further adjusts the selected factor, such that the line scanning time of the scanner is made to be substantially equal to the calculated required line scanning time, and
    such that the inputted frame rate is set with priority over adjustment of a dividing ratio.

2. The scanning laser microscope according to claim 1,
    wherein an image in a capture area, which is a part of a scanning area to be scanned by the laser light, is obtained, and the controller adjusts, out of the number of data in one line of the drive waveform data, a number of data of the drive waveform data in a scanning area other than the capture area, or a number of data of the drive waveform data when driving the scanner from the end of a predetermined line to the beginning of the next line.

3. The scanning laser microscope according to claim 1, further comprising a circuit that generates a signal in the read cycle by converting a reference frequency clock signal using a predetermined dividing ratio,
    wherein the controller reduces the read cycle in steps by changing the dividing ratio in the circuit, and increases/decreases the number of data in the drive waveform data so as to substantially match the time for the scanner to scan one line with the required line scanning time when the time for the scanner to scan one line is not the required line scanning time.

4. A scanning laser microscope that performs scanning on a sample with laser light and obtains images of the sample using the light from the sample, comprising:
    a scanner that performs scanning on the sample with the laser light line by line;
    a controller that receives an input of a frame rate directly for obtaining images of the sample,
    wherein the controller calculates a required line scanning time that is required as time used for scanning one line by the scanner,
    wherein the scanner scans at the calculated required line scanning time, and
    wherein the controller adjusts the line scanning time of the scanner to be substantially equal to the calculated required line scanning time, such that the inputted frame rate is set with priority over adjustment of a dividing ratio.

5. The scanning laser microscope according to claim 4,
    wherein the controller calculates time required for scanning one frame from the inputted frame rate.

* * * * *